(12) United States Patent
Zeinfeld

(10) Patent No.: US 9,311,352 B2
(45) Date of Patent: Apr. 12, 2016

(54) SYSTEM AND METHOD FOR EXTERNAL EQUIPMENT MONITORING

(71) Applicant: Michael Zeinfeld, Chicago, IL (US)

(72) Inventor: Michael Zeinfeld, Chicago, IL (US)

( * ) Notice: Subject to any disclaimer, the term of this patent is extended or adjusted under 35 U.S.C. 154(b) by 85 days.

(21) Appl. No.: 14/482,241

(22) Filed: Sep. 10, 2014

(65) Prior Publication Data

US 2015/0070139 A1 Mar. 12, 2015

Related U.S. Application Data

(60) Provisional application No. 61/876,137, filed on Sep. 10, 2013.

(51) Int. Cl.
G08B 21/00 (2006.01)
G06F 17/30 (2006.01)
H04L 12/64 (2006.01)

(52) U.S. Cl.
CPC ...... *G06F 17/30386* (2013.01); *H04L 12/6418* (2013.01)

(58) Field of Classification Search
CPC .............. G06F 17/30091; G06F 17/30386; H04L 12/00
See application file for complete search history.

(56) References Cited

U.S. PATENT DOCUMENTS

| 6,085,090 | A | * | 7/2000 | Yee | G01S 5/0027 342/450 |
| 2010/0156603 | A1 | * | 6/2010 | Doyle | G06K 17/00 340/10.1 |
| 2011/0072132 | A1 | * | 3/2011 | Shafer | G06Q 10/087 709/224 |
| 2012/0105214 | A1 | * | 5/2012 | Sanders | H04L 67/327 340/10.42 |

* cited by examiner

*Primary Examiner* — Mark Rushing
(74) *Attorney, Agent, or Firm* — White-Welker & Welker, LLC; Matthew T. Welker, Esq.

(57) ABSTRACT

The present invention is a system and method for external equipment monitoring. The presenting invention uses a network of sensor-devices that constitute a system that provides information about entities within a facility, where entities may mean industrial equipment, personnel, parts, raw materials, etc. The invention allows the entities to be tracked; monitored and optimized without input from a user of what type of entity or what type of entity it is (e.g., users, rooms, etc. can be monitored. The present invention uses devices that do not require an electronic connection to the entity and with the ability for one entity to monitor the activity of another entity.

14 Claims, 3 Drawing Sheets

SYSTEM AND METHOD FOR EXTERNAL EQUIPMENT MONITORING

CROSS REFERENCE TO RELATED APPLICATIONS

This application claims priority from U.S. Patent Application Ser. No. 61/876,137, entitled "System and Method for External Equipment Monitoring t", filed on 10 Sep. 2013. The benefit under 35 USC §119(e) of the United States provisional application is hereby claimed, and the aforementioned application is hereby incorporated herein by reference.

FEDERALLY SPONSORED RESEARCH: Not Applicable

SEQUENCE LISTING OR PROGRAM: Not Applicable

TECHNICAL FIELD OF THE INVENTION

The present invention relates generally to external monitoring of equipment. More specifically, the present invention relates to the external monitoring of equipment containing a network of sensor-devices that constitute a system which provides information about entities within a facility and allows the entities to be tracked, monitored, and optimized.

BACKGROUND OF THE INVENTION

Heavy industrial and commercial equipment like forklifts, air compressors, robots, and inventory systems rotating equipment are commonly combined with "monitoring" devices which allow a user to track important information about the equipment. These systems may consist of one more external monitoring devices that operate under a connection to equipment and are installed onto equipment, and devices which are built directly into the equipment when the equipment is manufactured.

These systems are used for tracking utilization and important activities related to equipment so that service professionals and facilities managers can plan for maintenance and optimization of equipment. The end goal of these monitoring devices is for the entire facility to operate more efficiently.

For example, a forklift may have a device installed after-market or built into the machinery which will communicate "hours" that the forklift runs. A service company or the owner of the vehicle may be able to tap into this data remotely to correctly determine when service of the vehicle is needed without having to physically inspect the vehicle.

In another example, mobile tablets connected or resting on equipment can be used in a situation where equipment must be inspected before use. For example, a worker may have to physically inspect an environment to assure safety standards are met before or during operation. In this example, a worker may need to physically inspect a mass of a forklift to make sure there are no cracks, check a box on a computer program (tablet) or paper-clipboard.

In another example, when a part fails, needs repair, or is worn down a user must physically open up a piece of equipment to determine what part needs repair or rely on obscure error codes from diagnostics, which usually obtain their information from broken connections rather from the physics of the parts themselves.

These methods are insufficient because they require installation, are manual in nature (e.g., tracking info on a tablet), and/or do not provide enough information because of the methods in which they are tracked.

Examples of these insufficiencies include the installation of monitoring device on a forklift. Installing such a device after-market or during manufacturing takes technician time and installation procedures can vary from forklift brand to forklift brand. Additionally, different devices are needed for different types of equipment. For example, a device that monitors a forklift may not have the ability to monitor another machine, such as an air compressor.

Another inefficiency is the potential lack of details available to these devices. For example, a forklift monitoring device may transmit "hours", but may not be able to differentiate activity "driving" versus "lifting", for example, which is important to end users.

Yet another inefficiency is when new equipment, materials or personnel are brought into a facility (e.g., service professionals or equipment that is being rented), should they include monitoring devices, they will not necessarily be linked to the facility's data system.

Yet another inefficiency is the ability of monitoring devices to take into account environmental factors such as the general "sound" of equipment. For example, workers are instructed to "listen" for irregular sounds emitting from equipment as a potential alert that something is or is about to malfunction.

In another example, in safety inspections, a worker may need to physically check that there is no oil spill, that wheels are full of air, etc. After checking, the worker may manually enter in on a tablet attached (or not attached) to a forklift that the safety inspection was complete.

DEFINITIONS

Entities are defined as industrial equipment, personnel, parts, and raw materials.

Radio-frequency identification (RFID) is the wireless non-contact use of radio-frequency electromagnetic fields to transfer data, for the purposes of automatically identifying and tracking tags attached to objects. The tags contain electronically stored information

SUMMARY OF THE INVENTION

The present invention is a system and method for external equipment monitoring. The presenting invention uses a network of sensor-devices that constitute a system that provides information about entities within a facility, where entities may mean industrial equipment, personnel, parts, raw materials, etc. The invention allows the entities to be tracked, monitored, and optimized without input from a user of what type of entity or what type of entity it is (e.g., users, rooms, etc. can be monitored. The present invention uses devices that do not require an electronic connection to the entity and with the ability for one entity to monitor the activity of another entity.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention is a system and method for external equipment monitoring. The presenting invention uses a network of sensor-devices that constitute a system that provides information about entities within a facility, where entities may mean industrial equipment, personnel, parts, raw materials, etc. The invention allows the entities to be tracked, monitored, and optimized without input from a user of what type of entity or what type of entity it is (e.g., users, rooms, etc. can be monitored. The present invention uses devices that do not require an electronic connection to the entity and with the ability for one entity to monitor the activity of another entity.

Figure 1:
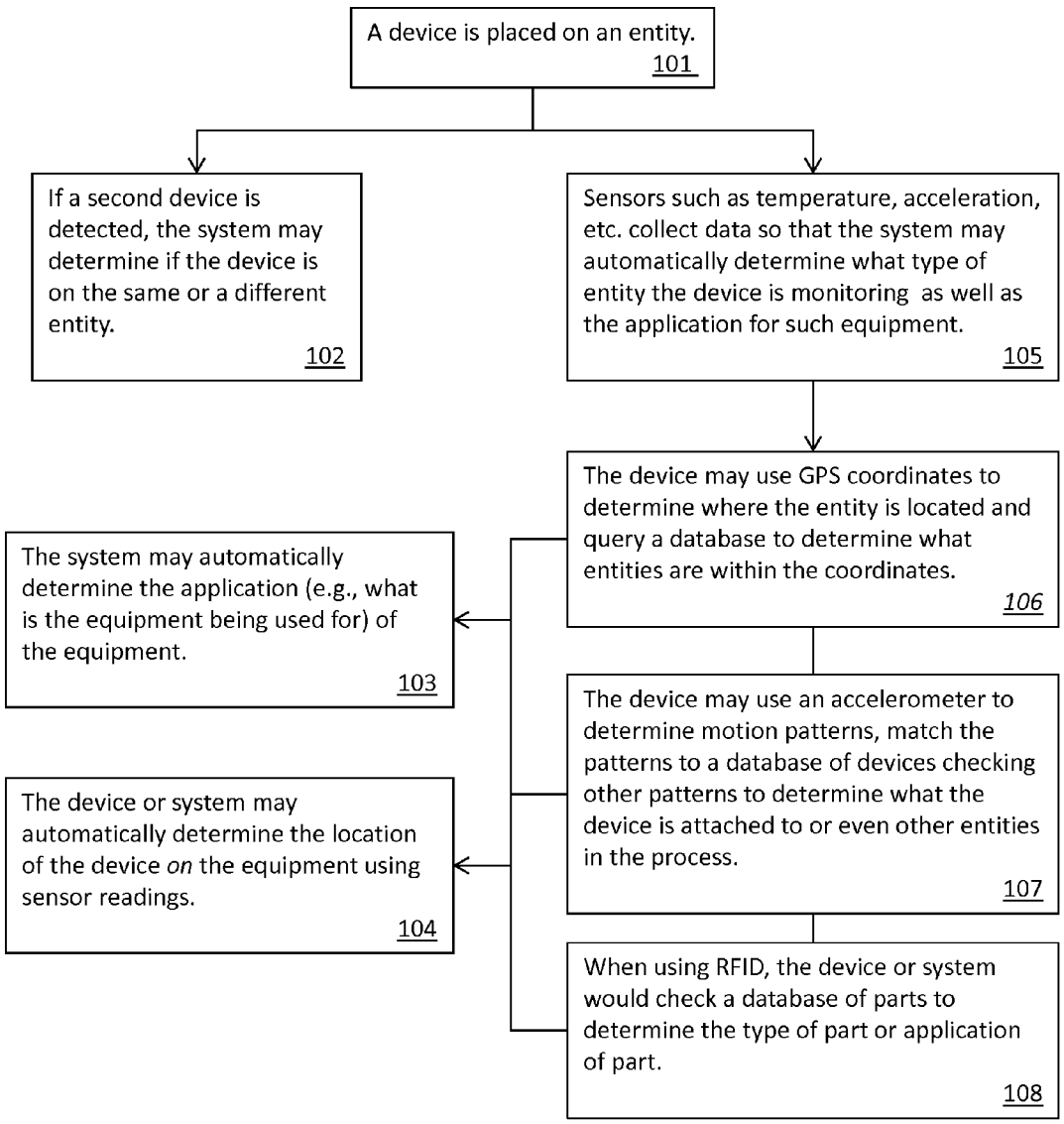
FIG. 1 illustrates the automatic detection of equipment type, application, parts, and processes.

The automatic detection of equipment type, application, parts, and processes is shown in FIG. 1. In a first step 101, a device is placed on an entity such as a forklift for the purpose of tracking activity of the entity. The present invention uses sensors such as temperature, acceleration, sound, etc., or other data so that the system may automatically determine what type of entity the device is monitoring (such as forklift or air compressor, generator, or other) as well as the application for such equipment (what is the device being used to make or build) 105.

For example, the device may use an accelerometer to determine motion patterns, sound and 3D imaging or other sensors to match the patterns to a database of devices checking other patterns to determine what the device is attached to or even other entities in the process 107. Additionally, the device may use GPS coordinates to determine where the entity is located and query a database to determine what entities are within the coordinates 106.

The system may automatically determine the application (e.g., what is the equipment being used for) of the equipment using factors such as: raw materials/physical parts (RFID, substance testing) 103. For example, the device or system may sense parts associated with developing automobiles because there are automobile parts with tagged with RFID.

When using RFID, the device or system would check a database of parts to determine the type of part or application of part 108. Or, the device or system may scan the dimensions/weight of a raw material to determine what material is being processed.

The device or system may automatically determine the location of the device on the equipment using sensor readings 104. For example, if the device senses that there is significant motion up and down, than it has likely been placed on the mass of a forklift. Or, for example, if the device senses that there is significant shaking and a high temperature correlated with rate of shaking, it may be placed on the fan of a compressor. Or, for example, if the device senses the sound of a motor, the device would assume that it is in the motor compartment. The user may input into the device or system where on the equipment the device has been placed or, the device may utilize RFID, signal strength to other known devices to determine where on the equipment the device has been placed.

If a second device is detected 102, the system may determine if the device is on the same or a different entity. For example, it may use sensor data to determine if motion and temperature patterns are similar and thus conclude if it is on the same or different entity.

For example, device A is placed on a forklift engine compartment and device B is placed on a forklift mast. Device A and B determine together that they are both on the same forklift because the motion patterns are similar. Additionally this can be achieved through RFID tagging and BLUETOOTH or wi-fi signal strength/variability/noise.

The method may also use machine device IDs, for example BLUETOOTH identifiers already embedded in the machines as a surrogate sensor, to identify machines in the system or those that are not in the system, or, making clear that the sensor may already be on the entity and initially not part of the system. Examining the signal would then allow the entity to be part of the system, as if the external sensor was placed on it intentionally.

In another example, device A is attached to a forklift and device B is attached to a forklift driver. Device A determines that device B are both associated with the same forklift. Additionally, in this example, if there was not a device on the forklift, device B (on a person), would determine it is on a forklift, and measure forklift activity.

Figure 2:
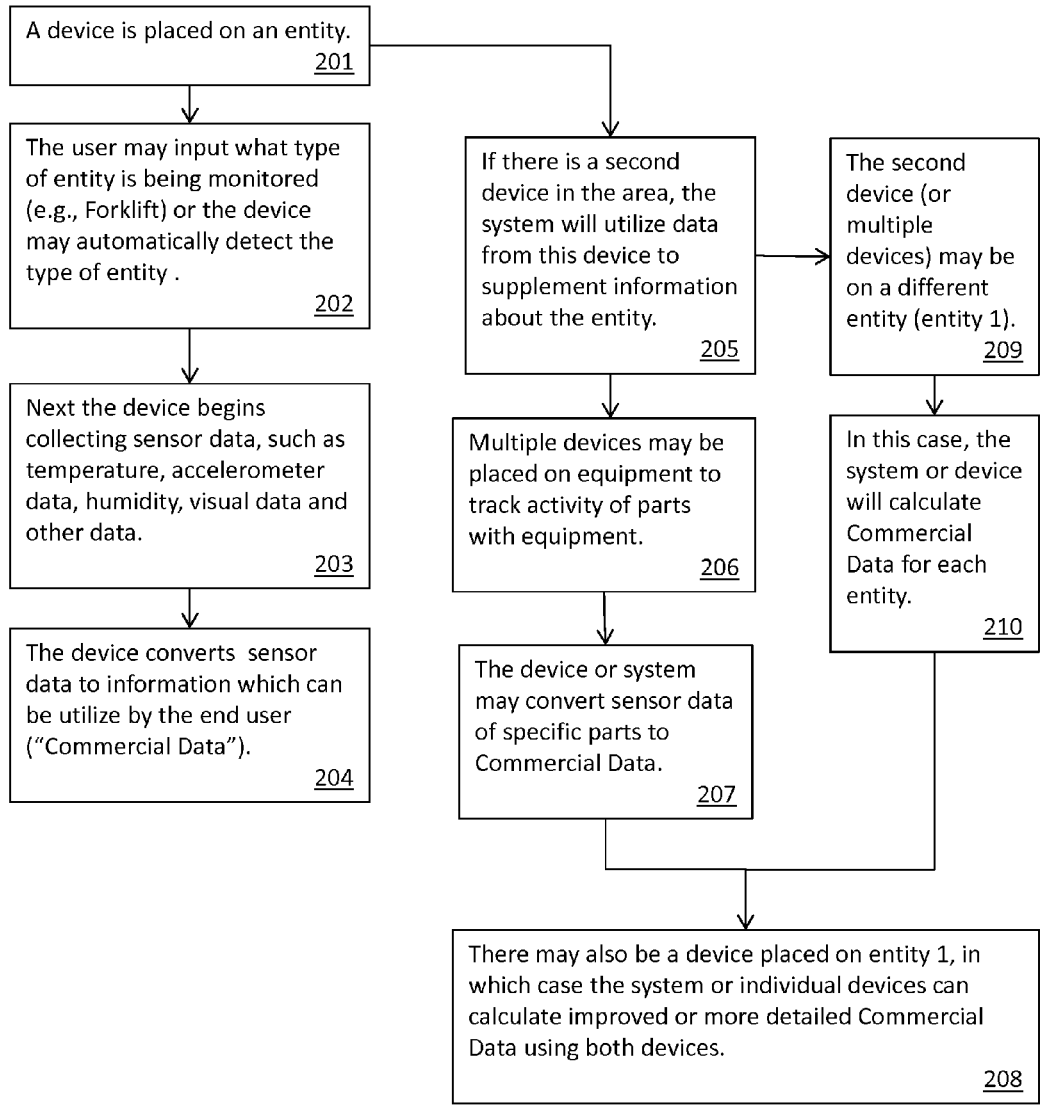
FIG. 2 illustrates the method for tracking and monitoring entities without direct connection from device to equipment is shown.

Now referring to FIG. 2, the method for tracking and monitoring entities without direct connection from device to equipment is shown. A device is placed on an entity, such as an air compressor, forklift 201. The user may input what type of entity is being monitored (e.g., Forklift) 202 or the device may automatically detect the type of entity as shown in FIG. 1, element 104. Next the device begins collecting sensor data, such as temperature, accelerometer data, humidity, visual data and other data 203. The device or system connected to the device converts sensor data to information which can be utilize by the end user ("Commercial Data") in step 204.

For example, when and if the device calculates accelerometer force data above a certain threshold, it tracks seconds of use. Seconds are accumulated in data memory to track hours used, an example of Commercial Data.

If there is a second device in the area, the system will utilize data from this device to supplement information about the entity 205. For example, if the second device is on a compressor Fan, and the first device is located in another area, the devices may use accelerometer data to determine idle hours (activity) versus run hours, which is an important distinction to facilities managers.

Multiple devices may be placed on equipment to track activity of parts with equipment 206. In the same way, the device or system may convert sensor data of specific parts to Commercial Data 207. For example, a small device can be placed on a spinning fan to determine hours that the fan is spinning Another small sensor can be placed on an oil cap to determine the last time the oil was changed (the oil cap was moved). The devices may provide information to each other in tandem to calculate Commercial Data. For example, the device or system can calculate fan hours with or without oil changes.

The second device (or multiple devices) may be on a different entity (entity 1) 209. For example, the device may be located on a User (entity 2). In this case, the system or device will calculate Commercial Data for each entity 210. A User (entity 2) may be driving a forklift (entity 1). The system or device will utilize accelerometer data to convert to Commercial Data for entity 1.

The method may also use the lack of a sensor signal to determine commercial data. For example, a sensor is on an employee, an employee or group of employees are supposed to clean a bathroom, no sensor data is detected in the bathroom, and thus the bathroom is determined not to have been cleaned.

Additionally, there may also be a device placed on entity 1, in which case the system or individual devices can calculate improved or more detailed Commercial Data using both devices 208. For example, the system may determine Hours that the Forklift is on when there is no user in proximity to the forklift, which would be meaningful to determine inefficiencies.

Additionally, either device may use wi-fi or other signal "noise"/variability in network signal as data. For example, device 1 may detect "noise" in the wi-fi signal from device 2 which would indicate "movement" in device 2. Or, a signal receptor may be used on itself to determine activity based on signal noise, which can be converted to Commercial data about Entity 1 using data from the System.

In another example, an forklift may have devices placed on the wheels and mast. A User, who also has a device, perhaps on his or her wrist, may physically inspect the forklift as required by safety protocols. The devices will track physical inspection using proximity of the User Sensor to the forklift sensors.

In another example, hours used by an air compressor may be classified based on other Entities in the system. For example, if the system detects raw materials (from devices placed on containers) or other equipment associated with pharmaceutical production, the system can classify hours tagged with a particular application, in this case, development of pharmaceuticals. This can also be accomplished utilizing GPS data to determine the location of the equipment and what company is using the equipment.

Note that the above may be able to be used for other diagnostic situations, for example, in a hospital setting to determine what areas of the body are examined.

The data from these devices on Parts may be sent to a database. When a part malfunctions, the data can be utilized to develop specifications for 3D printing or to determine the specific parts necessary to fix the entity.

Figure 3:
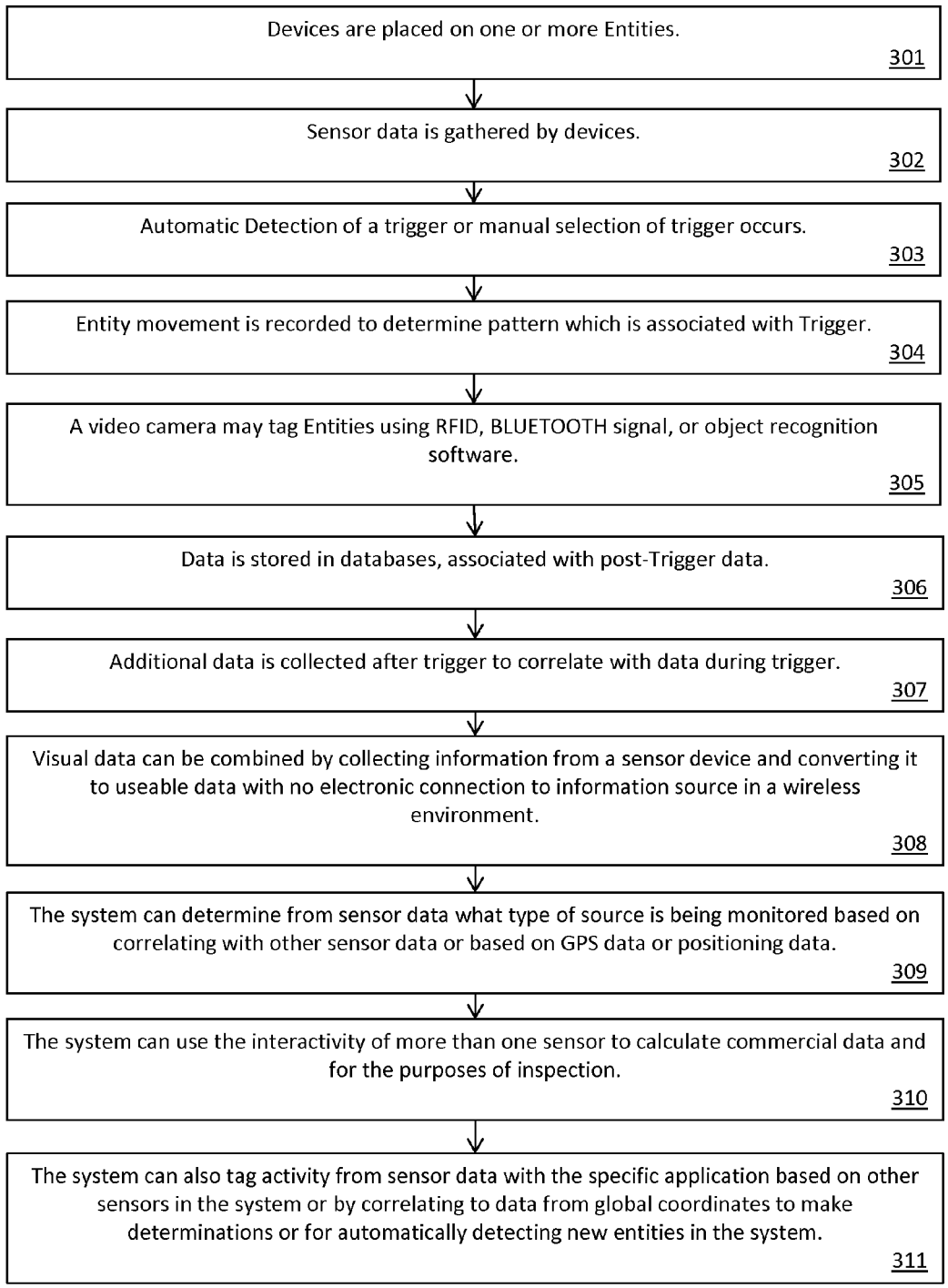
FIG. 3 illustrates the identifying and recording processes in relation to triggers in the system of the present invention.

FIG. 3 illustrates the identifying and recording processes in relation to triggers in the system of the present invention. Devices are placed on one or more Entities 301. For example, devices may be placed on forklifts, forklift drivers and parts within an entity. Sensor data is gathered by devices 302. Automatic Detection of a trigger or manual selection of trigger occurs. A trigger by a device indicates something new is happening 303. A new user not typically in the system or an acceleration or local coordinate that is an outlier. A part in the system is moved in a direction out of pattern such as changing a tire or inspecting a part. A service professional (new user not recognized) or a user who is not correlated with regular use of an entity performs the task such as an unusual sound emitting from equipment.

Entity movement is recorded to determine pattern which is associated with Trigger 304. For example, a service professional may be fixing a tire. Tire movement is recorded using devices. Additionally, the Service professional may be wearing a video camera, which further documents entity and device Movement. The video camera may tag Entities using RFID, BLUETOOTH signal, or object recognition software. Time, Temperature and other sensor data from the device is also associated with this Trigger.

For example, time which a Service Professional is spent interacting with the entity and parts within the entity may be used for billing purposes. Extremity movement, such as from a human or robot, would also be associated with the Trigger, to determine motions which were associated with post-Trigger data. Data is stored in databases, associated with post-Trigger data 306. Additional data is collected after trigger to correlate with data during trigger 307. For example, the efficiency of the entity may be tracked to determine if a fix was effective or not.

In another embodiment of the present invention, the visual data or auditory can be combined by collecting information from a sensor device and converting it to useable data with no electronic connection to information source in a wireless environment 308. The system can determine from sensor data what type of source is being monitored based on correlating with other sensor data or based on GPS data or positioning data 309. The system can use the interactivity of more than one sensor to calculate commercial data and for the purposes of inspection 310. The system can also tag activity from sensor data with the specific application based on other sensors in the system or by correlating to data from global coordinates to make determinations or for automatically detecting new entities in the system 311.

The method taught by the present invention is set to run and/or executed on one or more computing devices. A computing device on which the present invention can run would be comprised of a CPU, hard disk drive, keyboard or other input means, monitor or other display means, CPU main memory or cloud memory, and a portion of main memory where the system resides and executes. Any general-purpose computer, tablet, smartphone, or equivalent device with an appropriate amount of storage space, display, and input is suitable for this purpose. Computer devices like this are well known in the art and are not pertinent to the invention. The method of the present invention can also be written or fixed in a number of different computer languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for the automatic detection of equipment and monitoring, recorded on computer-readable medium and capable of execution by a computer comprising the steps of:
   automatic detection of equipment type, application, parts, and processes;
      placing a device on an entity for the purpose of tracking activity of the entity;
      using sensors so that the system may automatically determine what type of entity the device is monitoring as well as the application for such equipment;
      using GPS coordinates to determine where the entity is located and query a database to determine what entities are within the coordinates;
      automatically determining the application of the equipment;
   converting sensor data to information which can be utilize by an end;
   identifying and recording processes in relation to triggers in the system of the present invention;
      placing devices on one or more entities;
      gathering sensor data by the devices;
      providing an automatic detection of a trigger or manual selection of a trigger event;
      a trigger by a device indicates something new is happening;
      identifying a new user not typically in the system or an acceleration or local coordinate that is an outlier;
      determining which part in the system is moved in a direction out of pattern;
      recognizing a service professional or a user who is not correlated with regular use of an entity performing the task; and
      recording entity movement to determine pattern which is associated with the trigger.

2. The method of claim 1, further comprising the steps of using Radio-frequency identification (RFID) to check a database of parts to determine the type of part or application of part.

3. The method of claim 1, further comprising the steps of determining the location of the device on the equipment using sensor readings.

4. The method of claim 1, further comprising the steps of detecting a second device; and
   determining if the device is on the same or a different entity.

5. The method of claim 1, further comprising the steps of placing multiple devices on equipment to track activity; and
   utilizing data from a second device to supplement information about the entity.

6. The method of claim 1, further comprising the steps of converting sensor data of specific parts to Commercial Data.

7. The method of claim 4, wherein two or more devices may be on each different entity and
   calculating Commercial Data for each entity; and
   calculating improved or more detailed Commercial Data using both devices.

8. The method of claim 1, further comprising the steps of sending data from the entities to a database.

9. The method of claim 1, further comprising the steps of determining a part malfunction;
   determine the specific parts necessary to fix the entity;
   developing specifications for 3D printing; and
   generating instructions to 3D print replacement parts.

10. The method of claim 1, further comprising the steps of using a video camera to tag Entities using RFID, BLUETOOTH signal, or object recognition software; and
    associating Time, Temperature and other sensor data with the Trigger.

11. The method of claim 10, further comprising the steps of combining the visual data by collecting information from a sensor device and converting it to useable data with no electronic connection to information source in a wireless environment;
    determining from sensor data what type of source is being monitored based on correlating with other sensor data or based on GPS data or positioning data;
    using the interactivity of more than one sensor to calculate commercial data and for the purposes of inspection; and
    tagging activity from sensor data with the specific application based on other sensors in the system or by correlating to data from global coordinates to make determinations or for automatically detecting new entities in the system.

12. The method of claim 10, further comprising the step of assigning machine device ID using identifiers already embedded in the machines wireless transmission device, as a surrogate sensor, to identify machines in the system, those that are not in the system, or making clear that the sensor may already be on the entity and initially not part of the system.

13. The method of claim 12, further comprising the steps of:
    tracking the identified machine device as part of the system.

14. The method of claim 6, further comprising the step of using the lack of a sensor signal to determine commercial data.

* * * * *